United States Patent [19]

Lamarche

[11] 4,441,595
[45] Apr. 10, 1984

[54] HYDRAULIC PRESSURE RELIEF VALVE FOR LOCK-UP CLUTCH

[75] Inventor: Paul E. Lamarche, Utica, Mich.

[73] Assignee: Borg-Warner Corporation, Chicago, Ill.

[21] Appl. No.: 310,956

[22] Filed: Oct. 13, 1981

[51] Int. Cl.³ .............................. F16H 45/02
[52] U.S. Cl. ................................. 192/3.29
[58] Field of Search ............... 192/106.1, 106.2, 101, 192/93 A, 3.28, 3.29, 3.3, 3.31, 70.23, 56 F; 464/64, 68

[56] References Cited

U.S. PATENT DOCUMENTS

| | | | |
|---|---|---|---|
| 2,574,573 | 11/1951 | Libby | 64/27 |
| 3,734,251 | 5/1973 | Annis et al. | 192/3.3 |
| 3,972,397 | 8/1976 | Cheek | 192/3.3 |
| 3,977,502 | 8/1976 | Chana | 192/3.3 |
| 4,091,899 | 5/1978 | Stevenson | 192/3.3 |
| 4,167,993 | 9/1979 | Vukovich et al. | 192/3.3 |
| 4,173,270 | 11/1979 | Croswhite et al. | 192/3.29 |
| 4,181,203 | 1/1980 | Malloy | 192/3.3 |
| 4,333,552 | 6/1982 | LaMarche | 192/3.29 |
| 4,360,090 | 11/1982 | Wonn | 192/3.3 |

OTHER PUBLICATIONS

U.S. Patent Application Serial No. 153,130 Filed May 27, 1980.

*Primary Examiner*—George H. Krizmanich
*Attorney, Agent, or Firm*—James A. Geppert

[57] ABSTRACT

A pressure relief valve to control the opening of a port between two pressure vessels at a predetermined time to eliminate differential pressure between the vessels. More particularly, the lock-up clutch assembly in a torque converter is actuated due to a pressure differential on the opposite sides of the clutch or piston plate, and the pressure relief valve will open upon deceleration of the vehicle driven by the torque converter to equalize the pressure on the opposite sides of the clutch plate and allow disengagement of the clutch plate from the torque converter housing.

12 Claims, 15 Drawing Figures

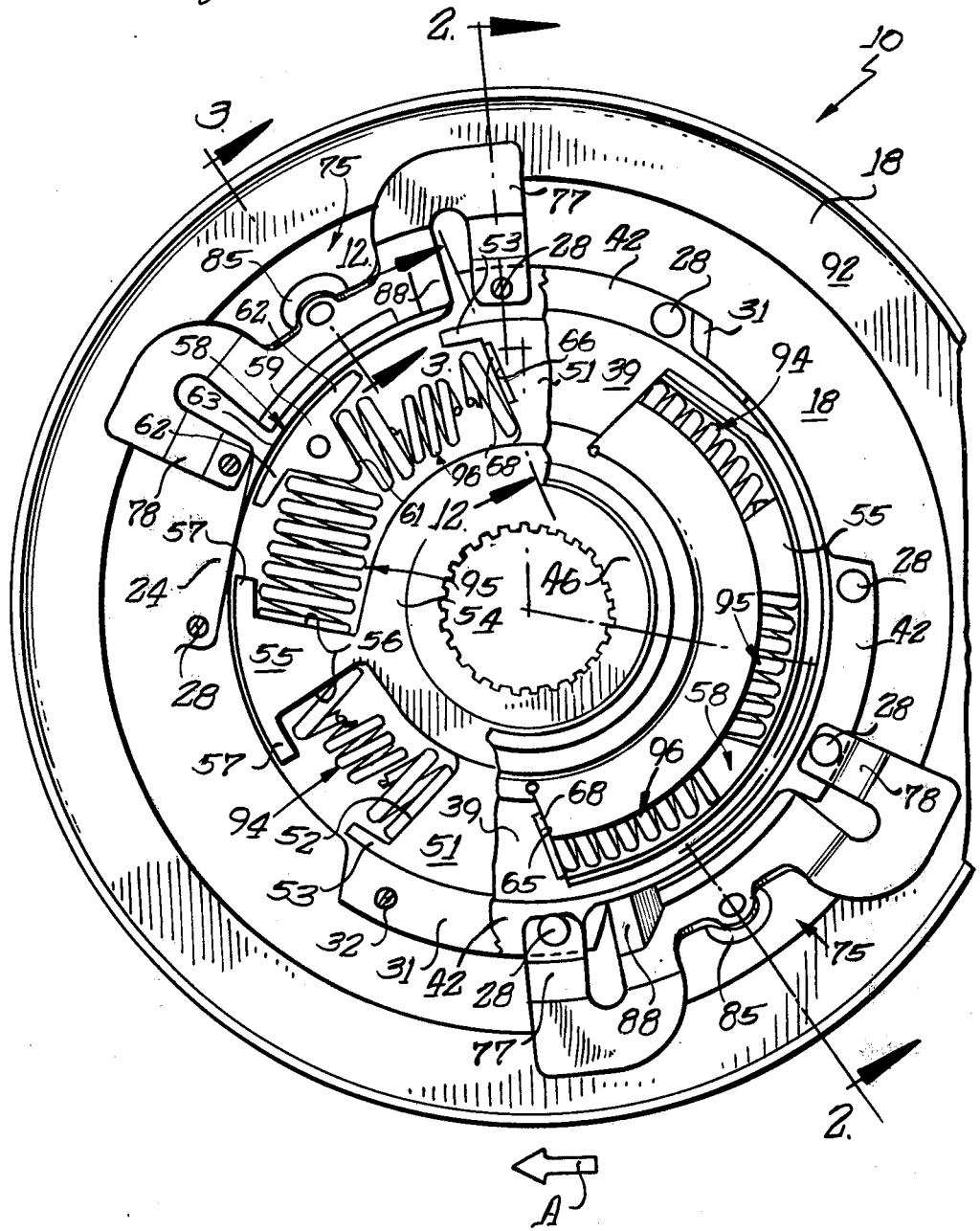

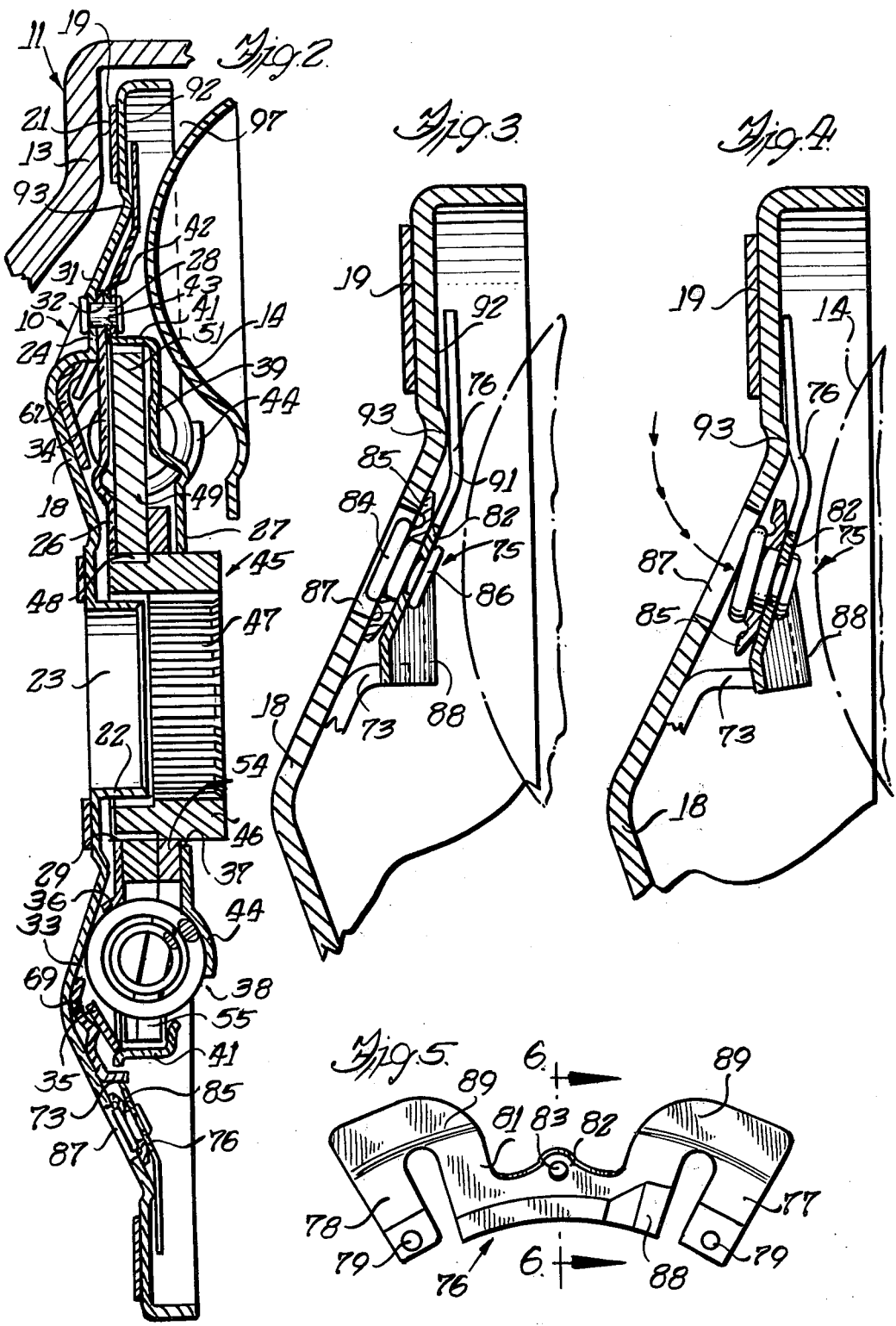

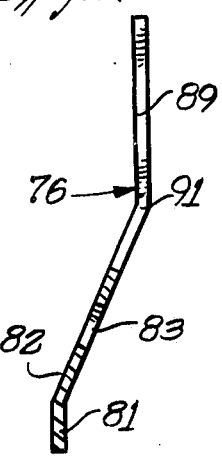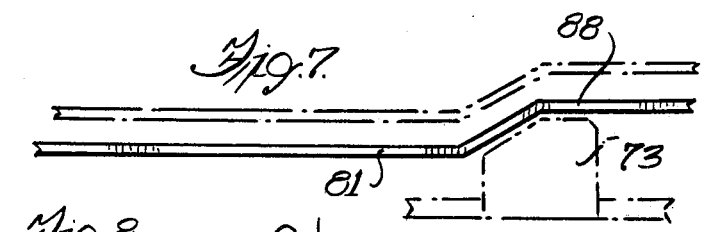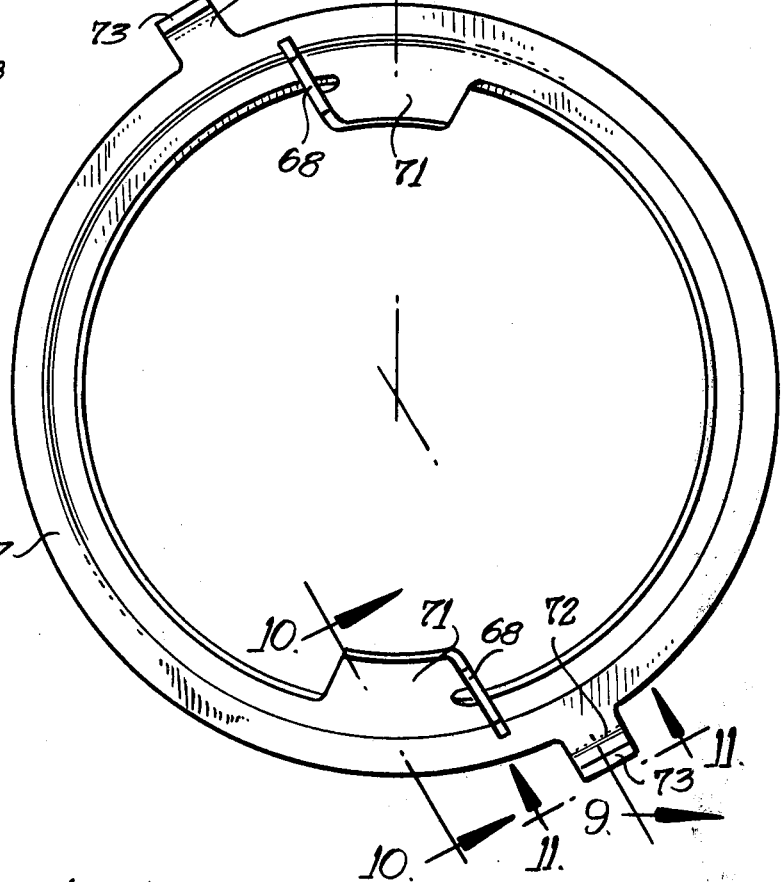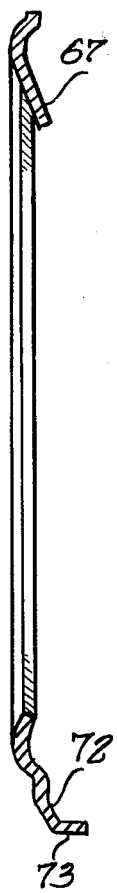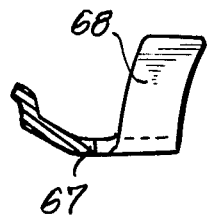

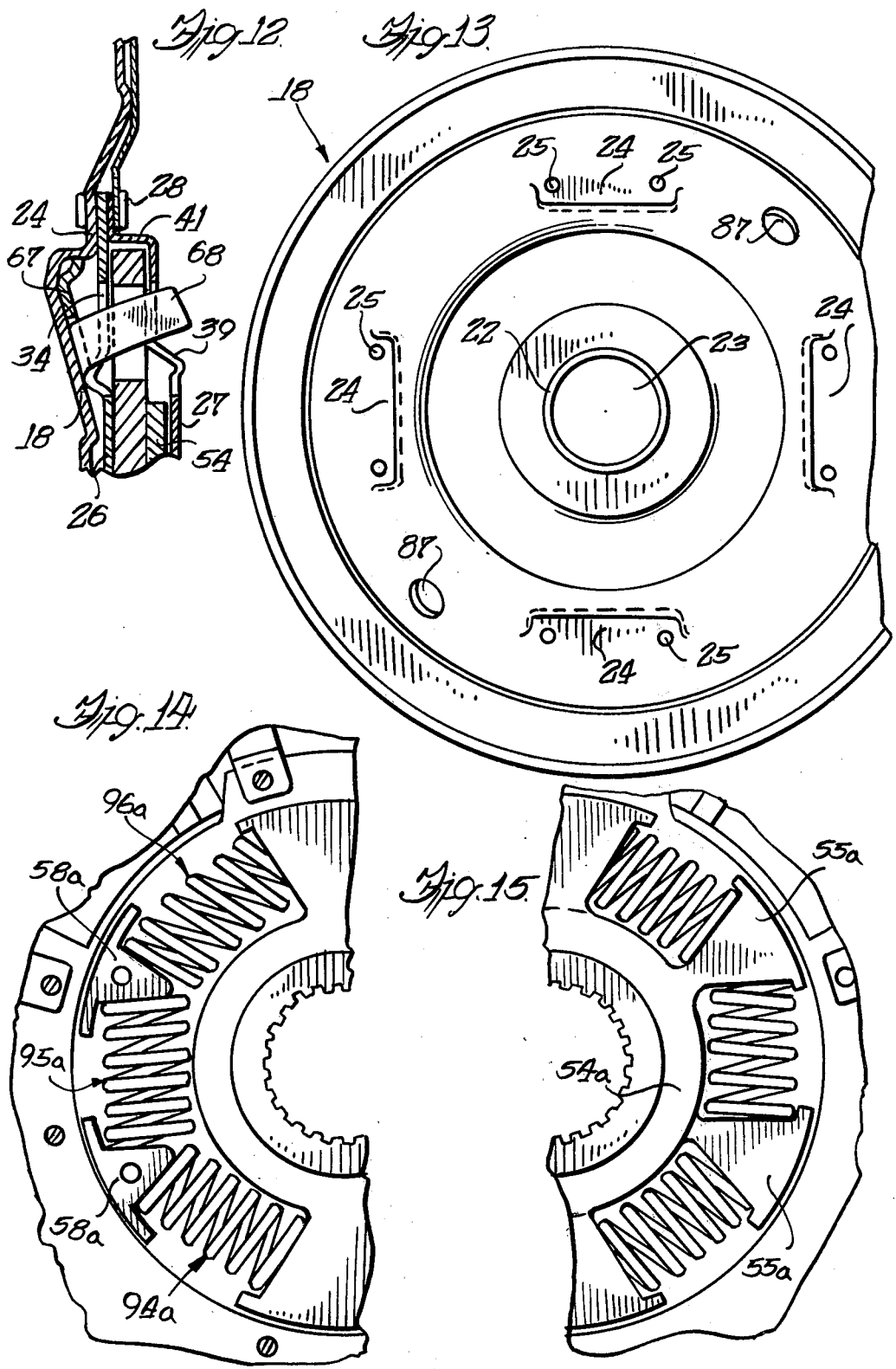

HYDRAULIC PRESSURE RELIEF VALVE FOR LOCK-UP CLUTCH

BACKGROUND OF THE INVENTION

The present invention relates to a lock-up clutch utilized in a torque converter providing a direct drive between the impeller and turbine of the torque converter to improve the fuel efficiency of the transmission. The lock-up clutch assembly includes a piston or clutch plate located in the torque converter between the forward wall of the housing and the turbine. The piston plate is operatively connected to the transmission input shaft through the turbine hub, and a vibration damper may be inserted between the piston plate and the turbine hub to dampen any torsional vibrations occurring from the vehicle engine or other driving means.

The piston plate and associated structure is designed to axially reciprocate relative to the turbine hub and transmission input shaft so that an annular friction facing on the piston plate engages a mating friction surface in the torque converter housing. Actuation of the piston plate is caused by a pressure differential in the chambers formed on the opposite sides of the piston plate due to the pressure increase resulting from operation of the torque converter. To disengage the lock-up clutch, the pressure differential must be equalized or reversed to allow the piston plate to retract, which may be accomplished by providing a source of pressure acting on the opposite side of the pressure plate.

If the vehicle operator lifts his foot from the accelerator pedal, thus decreasing the engine revolutions, a quick and positive disengagement of the clutch piston plate is desirable; especially for a vehicle powered by a diesel engine. The use of a pressure source to retract the plate and/or a one-way clutch in the operative connection between the piston plate and turbine hub has not satisfactorily solved the problem of disengagement of the clutch, however, the pressure relief valve of the present invention appears to obviate the problem.

SUMMARY OF THE INVENTION

The present invention comprehends the provision of a hydraulic pressure relief valve utilized for equalization of pressure on the opposite sides of the piston or clutch plate of a lock-up clutch in a torque converter, and more specifically to a lock-up clutch for a torque converter employing a vibration damper assembly similar to that shown in FIGS. 8 through 14 of copending U.S. patent application Ser. No. 45,711 filed June 5, 1979, now U.S. Pat. No. 4,304,107. This invention is an improvement on the pressure relief valve shown in U.S. patent application Ser. No. 153,130, filed May 27, 1980, now U.S. Pat. No. 4,333,552.

The present invention also comprehends the provision of one or more novel hydraulic pressure relief valves that are operatively connected to and actuated by the movement of a floating equalizer in the vibration damper assembly to control one or more ports formed in the piston plate of the lock-up clutch.

In the neutral and drive modes of the torque converter, the valves retain the ports in closed condition so that a pressure differential may exist on the opposite sides of the piston plate to provide engagement of the lock-up clutch at predetermined conditions in the torque. However, when in the coast mode, the valves are lifted by a cam due to relative movement between the vibration damper structure and piston plate to open the ports in the piston plate and result in a pressure equilibrium on the opposite sides of the piston plate.

The present invention further comprehends the provision of a hydraulic pressure relief valve in a torque converter lock-up clutch wherein the valve is always in motion to provide improved calibration and life of the valve unit and has a positive actuation.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a rear elevational view of a vibration damper assembly for a torque converter lock-up clutch with portions broken away and showing the hydraulic relief valve of the present invention.

FIG. 2 is a cross sectional view taken on the irregular line 2—2 of FIG. 1.

FIG. 3 is a partial cross sectional view taken on the line 3—3 of FIG. 1.

FIG. 4 is a partial cross sectional view similar to FIG. 3, but showing the relief valve in open position.

FIG. 5 is a top plan view of the relief valve spring plate.

FIG. 6 is a cross sectional view of the spring plate taken on the line 6—6 of FIG. 5.

FIG. 7 is an edge view of the spring plate taken on the line 7—7 of FIG. 5.

FIG. 8 is a rear elevational view of the cam ring to actuate the valve.

FIG. 9 is a cross sectional view of the cam ring taken on the irregular line 9—9 of FIG. 8.

FIG. 10 is a partial cross sectional view taken on the line 10—10 of FIG. 8.

FIG. 11 is an end elevational view taken on the line 11—11 of FIG. 8.

FIG. 12 is a partial cross sectional view taken on the line 12—12 of FIG. 1.

FIG. 13 is a front elevational view of the piston plate for the damper assembly.

FIG. 14 is a partial rear elevational view with portions broken away showing an alternate damper arrangement.

FIG. 15 is a partial rear elevational view similar to FIG. 14 but showing a third damper arrangement.

DESCRIPTION OF THE PREFERRED EMBODIMENTS

Referring more particularly to the disclosure in the drawings wherein are shown illustrative embodiments of the present invention, FIGS. 1 through 4 disclose a vibration damper assembly 10 adapted for use in a lock-up clutch 11 of a torque converter having a housing 13 driven by a vehicle engine (not shown) and secured to an impeller. A turbine 14 located in the housing is driven by the impeller and has an internally splined hub operatively connected to the damper which receives the splined end of a transmission input shaft (not shown).

The lock-up clutch includes a piston plate 18 having an annular friction surface 19 adjacent the periphery facing a mating friction surface 21 on the interior surface of housing 13 and an inner annular flange 22 defining a central opening 23. Also, the piston plate is provided with four rearwardly indented portions 24 spaced at 90° increments, each portion having a pair of spaced openings 25. The damper assembly 10 includes a pair of retainer plates 26 and 27 which are secured to the indented portions by rivets 28. The front retainer plate 26 is generally flat with a central opening 29, a pair of elongated oppositely disposed mounting flanges 31, 31 having openings 32 to receive the rivets 28 securing the plate to an opposed pair of the indented portions 24, and a pair of elongated arcuate spring windows 33, 33 separated by drive straps 34, 34; each window having an outer lip 35 and an inner arcuate ridge 36.

The rear retainer plate 27 also has a central opening 37, a pair of arcuate spring windows 38, 38 separated by a pair of inwardly offset drive straps 39, 39 and an outer axially extending peripheral wall 41 terminating in four circumferentially equally spaced elongated mounted flanges 42 having spaced openings 43 to receive the rivets 28 securing the flanges to the indented portions 24. Each spring window 38 has an inner inwardly extending lip 44.

A hub assembly 45 includes a hub barrel 46 having a central opening with internal splines 47 and a short external splined portion 48 at the forward end of the barrel. A hub plate 49 has a splined opening receiving the splined portion 48 of the barrel and a pair of diametrically opposed radially extending arms 51 having outwardly diverging edges 52 terminating in circumferentially oppositely extending fingers 53. The hub plate is secured onto the barrel as by staking to form a unitary member.

A floating equalizer ring 54 is journalled on the hub barrel rearwardly of the hub plate and has a pair of oppositely disposed radially extending arms or spring separators 55 with outwardly diverging edges 56 terminating in circumferentially oppositely extending fingers 57, the arms being forwardly offset (FIG. 2) into the path of damper springs 94 and 95. Also housed within the retainer plates are a pair of oppositely disposed floating spacers or spring separators 58, 58; each spacer having a generally wedge-shaped body 59 with outwardly converging edges 61 terminating in circumferentially oppositely extending ears 62. The arcuate outer surface 63 of each wedge slides on the inner surface of the peripheral wall 41 of plate 27.

Each drive strap 39 has a notch 65 formed in the diverging edge facing spring set 96 to receive one of two oppositely disposed rearwardly extending drive arms 68 (FIGS. 8, 10 and 12) of an annular cam ring 67; which arms are also received in notches 66 formed in one edge 52 of each hub arm 51. The cam ring 67 is concave in cross section (FIG. 9) and is slidably mounted in an annular recess 69 formed in the piston plate 18 radially inwardly of the indented portions 24. A pair of generally radially inwardly extending arms 71 each have one drive arm 68 extending rearwardly therefrom at one side thereof. Offset from arms 71 are a pair of oppositely disposed generally radially outwardly extending camming tab 73 (FIGS. 9 and 11) having an inclined edge 74 towards a flat spring for the relief valve.

Also secured to the piston plate 18 are a pair of oppositely disposed relief valve members 75, each member including a generally W-shaped flat compression spring 76 with the two outer arms 77,78 provided with openings 79 to receive rivets 28; one arm 77 being secured to the piston plate along with mounting flanges 31 and 42 of both plates 26 and 28, while the other arm 78 is secured along with a flange 42 alone. The central portion 81 of the spring has an outwardly and rearwardly inclined tab 82 with an opening 83 receiving a rivet 84 having an enlarged head supporting an annular resilient face seal 85, and a rivet retainer 86 secures the rivet to the tab. The piston plate 18 has a pair of diametrically opposed openings 87 therein adapted to be engaged by the face seals 85 as seen in FIGS. 2 and 3.

The central portion 81 also has an inner raised camming surface 88 (FIGS. 1, 5 and 7) above the normal position of the camming tab 83 of cam ring 67. The connecting portions 89, 89 between central portion 81 and the arms 77, 78 of spring 76 are bent at 91 to parallel the outer portion 92 of the pressure plate opposite friction surface 19 and extend over an annular ridge 93 formed in the pressure plate to provide a pivot edge for the spring 76 (FIGS. 2 and 3). Positioned circumferentially between the hub arms 51, the equalizer arms 55, and the separators 58 are two groups of springs; each group consisting of three spring sets 94, 95, 96.

Considering the operation of this device, when the transmission is in neutral or the torque converter is initially in the drive mode, the piston plate 18 is in its retracted position. As the torque converter impeller is accelerated and the speed of the turbine increases, the fluid pressure in the torque converter also increases, with the increasing pressure in chamber 97 acting on the rear surface of the piston plate 18 to urge it towards the housing 13. As the speed of the turbine approaches the now high speed of the impeller, the fluid pressure increases and acts on the piston plate until it engages the friction surface 21 on the housing 13 to lock the impeller and turbine together and provide a direct drive from the engine to the transmission. When lock-up occurs, torque is applied to the piston plate 18 in the direction of the arrow A.

Rotation of the piston plate 18 rotates the retainer plates 26, 27 and drive straps 34, 39 in a clockwise direction as seen in FIG. 1, which engage the spring sets 94, 94 to compress these springs against the arms 55 of equalizer ring 54 moving in windows 33,38 to compress the spring sets 95, 95 against the separators 58, 58. Compression of these springs urge the separators to compress the springs 96,96 which act on the hub arms 51, 51 so that the hub assembly 45 is also rotated in the direction of arrow A to rotate the input shaft 16. Compression of springs 96, 96 will also act against the drive arms 68 causing the cam ring 67 to rotate; the springs urging the arms 68 into the notches 66 in the hub arms 51. During rotation of the piston plate 18 and retainer plates 26, 27, the flat springs 76 urge the face seals 85 against the piston plate 18 to seal the openings 87 therein.

When the vehicle operator removes his foot from the accelerator pedal to decrease the speed of rotation of the housing 13 and impeller, the pressure in the chamber 97 is greater than the pressure on the opposite side of piston plate 18 to prevent retraction of the piston plate 18 to unlock the clutch. The torque converter and transmission are in a coast mode and the vehicle acts to drive the motor, causing the hub assembly to rotate in the opposite direction from arrow A relative to the piston plate resulting in the hub arms 51 acting to rotate the cam ring 67 through drive arms 68 counterclockwise so that the cam tabs 73 move relative to the flat springs 76 secured to the piston plate and the inclined edges 74 engage the camming corners 88 to lift the central portions 81 (FIG. 3) and cause them to pivot about the annular ridge 93 on the piston plate causing the seals 85 to lift and uncover their openings 87 and equalize the pressure differential between the opposite sides of the piston plate. However, pivotal movement of each spring is not sufficient to cause the spring to interfere with the turbine in the limited space shown in FIG. 3. The piston plate will then retract to unlock the clutch and will remain disengaged until fluid pressure again increases in chamber 97 upon acceleration of the torque converter.

FIGS. 14 and 15 disclose two alternate embodiments of the damper assembly utilizing the pressure relief valve. In FIG. 14, two pairs of oppositely disposed floating spring separators 58a, 58a are used to separate the springs 94a, 95a, 96a and the equalizer ring has been omitted. In FIG. 15, a pair of equalizer rings 54a, 54a having radial arms 55a, 55a are provided and the floating separators are omitted. In both alternative embodiments, the operation of the damper assembly and the pressure relief valve is identical to that described for FIGS. 1–13.

I claim:

1. A lock-up clutch assembly for a torque converter having a vibration damper therein, the assembly including a piston plate adapted to engage the torque converter housing, a hub assembly operatively connected to the turbine of the torque converter and having a pair of oppositely disposed radially extending arms, a pair of spring retainer plates journalled on and substantially enclosing the hub assembly, said plates being secured to the piston plate, a plurality of spring separators movably mounted within said retainer plates, and a plurality of compression springs positioned between said spring separators and hub arms, said retainer plates having diametrically oppositely disposed inwardly offset drive straps paralleling said hub arms in the path of the compression springs, the improvement comprising a pressure relief valve to equalize the fluid pressure on the opposite sides of the piston plate, said piston plate having at least one opening therein, said relief valve including a generally flat spring member secured to the piston plate, a resilient face seal carried by said spring member and normally sealing said opening, and a camming surface on the flat spring member, and a cam ring slidably mounted on said piston plate and having a camming tab generally aligned with and adjacent said camming surface, said cam ring being actuated by movement of said hub assembly in the coast direction to interengage said camming tab and said camming surface of said spring member to lift the face seal and uncover said opening.

2. A lock-up clutch assembly as set forth in claim 1, wherein said spring separators include an equalizer ring journalled on said hub assembly and having diametrically opposed radial arms, and a pair of oppositely disposed floating separators located between said equalizer arms and hub arms.

3. A lock-up clutch assembly as set forth in claim 1, in which said spring separators include two equalizer rings journalled on said hub assembly, each ring having a pair of oppositely disposed radial arms, one arm of each ring being located between said hub arms.

4. A lock-up clutch assembly as set forth in claim 1, in which said spring separators include two pair of floating separators slidably movable within said spring retainer plates and located between said compression springs.

5. A lock-up clutch assembly for a torque converter having a vibration damper therein, the assembly including a piston plate adapted to engage the torque converter housing, a hub assembly operatively connected to the turbine of the torque converter and having a pair of oppositely disposed radially extending arms, a pair of spring retainer plates journalled on and substantially enclosing the hub assembly, said plates being secured to the piston plate, a plurality of spring separators movably mounted within said retainer plates, and a plurality of compression springs positioned between said spring separators and hub arms, said retainer plates having diametrically oppositely disposed inwardly offset drive straps paralleling said hub arms in the path of the compression springs, the improvement comprising a pressure relief valve to equalize the fluid pressure on the opposite sides of the piston plate, said piston plate having at least one opening therein, said relief valve including a generally flat spring member having a generally W-shape with a pair of outer arms joined by a central portion, the radially inner end of each arm being secured to said piston plate, and the central portion including a camming surface and a radially outwardly inclined central tab carrying a resilient face seal normally sealing said opening, and a cam ring having a camming tab aligned with said camming surface and slidably mounted on said piston plate to be actuated by movement of said hub assembly in the coast direction to interengage said camming tab and said camming surface of said spring member to lift the face seal and uncover said opening.

6. A lock-up clutch assembly as set forth in claim 5, in which said piston plate has an annular ridge acting as a pivot surface, said outer legs extending radially outwardly beyond and contacting said pivot ridge.

7. A lock-up clutch assembly for a torque converter having a vibration damper therein, the assembly including a piston plate adapted to engage the torque converter housing, a hub assembly operatively connected to the turbine of the torque converter and having a pair of oppositely disposed radially extending arms, a pair of spring retainer plates journalled on and substantially enclosing the hub assembly, said plates being secured to the piston plate, a plurality of spring separators movably mounted within said retainer plates, and a plurality of compression springs positioned between said spring separators and hub arms, said retainer plates having diametrically oppositely disposed inwardly offset drive straps paralleling said hub arms in the path of the compression springs, the improvement comprising a pressure relief valve to equalize the fluid pressure on the opposite sides of the piston plate, said piston plate having at least one opening therein, said relief valve including a generally flat spring member secured to the piston plate, a resilient face seal carried by said spring member and normally sealing said opening, and a camming surface on the flat spring member, and a cam ring slidably mounted on said piston plate and adapted to be actuated by movement of said hub assembly in the coast direction to engage said camming surface of said spring member to lift the face seal and uncover said opening, said cam ring having an annular body, at least one radially inwardly extending arm and at least one radially outwardly extended arm, said outward arm terminating in a rearwardly extending camming tab generally aligned with said camming surface on said spring member.

8. A lock-up clutch assembly as set forth in claim 7, in which said inward arm terminates in a rearwardly extending drive arm projecting through an elongated window in said forward retainer plate to abut a drive strap and hub arm and be engaged by a compression spring.

9. A lock-up clutch assembly as set forth in claim 8, wherein rotation of the damper under drive conditions causes rotation of the cam ring so that the drive arm abuts said hub arm and, under coast conditions, said hub arm acts on said drive arm against the force of the compression spring to rotate said cam ring relative to said spring member and cam the face seal away from the piston plate to uncover the opening therein.

10. A lock-up clutch assembly as set forth in claim 1, in which said piston plate has a plurality of circumferentially spaced indentations upon which are mounted said retainer plates and said spring members.

11. A lock-up clutch assembly as set forth in claim 7, in which said spring member includes a generally U-shaped central portion joined to a pair of parallel outer arms, the radially inward free end of each arm being secured to said piston plate and the radially outer end joined to the central portion, the central portion having a central radially outwardly and rearwardly inclined tab carrying said face seal.

12. A lock-up clutch assembly as set forth in claim 11, in which said arms and central portion are bent to provide radially outer portions that parallel the piston plate surface, and said piston plate having an annular ridge contacting said last-mentioned outer portions to provide a pivot edge for said spring member.

* * * * *